Figure 1:
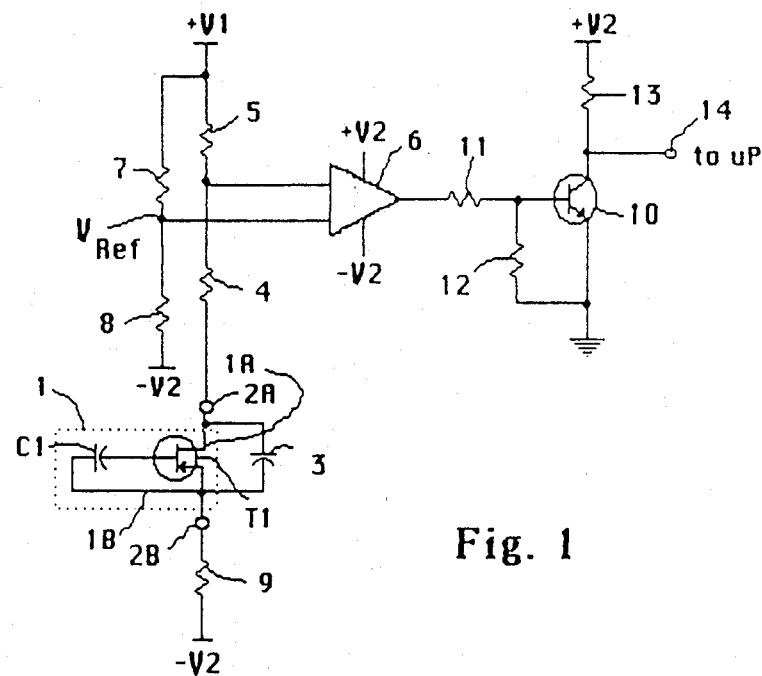

United States Patent [19]

Tomasi

[11] Patent Number: 4,672,663

[45] Date of Patent: Jun. 9, 1987

[54] TELEPHONE HANDSET DETECTOR

[75] Inventor: Richard L. Tomasi, Ottawa, Canada

[73] Assignee: Mitel Corporation, Kanata, Canada

[21] Appl. No.: 799,850

[22] Filed: Nov. 20, 1985

[30] Foreign Application Priority Data

Jun. 28, 1985 [CA] Canada ............................ 485827

[51] Int. Cl.⁴ .................... H04M 1/00; H04M 3/58; H04M 9/08
[52] U.S. Cl. .................... 379/388; 379/387; 379/214
[58] Field of Search ............... 179/81 R, 81 B, 27 D, 179/18 AD, 100 R; 379/388, 387, 389, 390, 214

[56] References Cited

U.S. PATENT DOCUMENTS 3,851,111 11/1974 Young ..................... 179/27 FF X
4,449,017 5/1984 Burke et al. ................... 179/27 D
4,499,337 2/1985 Elbaek .......................... 179/27 D
4,562,310 12/1985 Watters et al. ........... 179/18 AD X Primary Examiner—James L. Dwyer
Attorney, Agent, or Firm—Pascal & Associates

[57] ABSTRACT

An electronic telephone handset detector, for generating an output signal to an external controller indicative of a telephone handset being connected to or disconnected from a subscriber's set. A microphone input terminal is connected to a source of direct current such that in the event the microphone is connected to the terminal, direct current flows therethrough. A comparator circuit, connected in a circuit to the microphone input terminal, detects the current flowing through the microphone from the source of direct current and generates the aforementioned output signal in response thereto.

15 Claims, 1 Drawing Figure

TELEPHONE HANDSET DETECTOR

This invention relates to subscriber's sets in general, and in particular to a circuit for detecting the presence of a handset connected to a subscriber's set.

Present day subscribers'sets, such as telephone sets and operator consoles, typically incorporate one or more pairs of interlocking plugs and jacks for connecting handsets or headsets thereto.

For example, a handset typically has a four-wire lead extending therefrom, usually in the form of a coiled wire terminated at one end by a modular plug. The plug is designed to connectably engage a receptor jack disposed in the subscriber's set. A PABX, in conjuction with which the subscriber's set operates, detects whether or not the handset plug is connected to the jack, and implements one or more special features in response thereto.

For instance, the PABX may implement a "night service" mode, whereby incoming calls to the subscriber's set are automatically rerouted to a predetermined further subscriber's set in the event the handset is disconnected. Alternatively, the PABX may automatically implement a speakerphone mode of operation (in the event the subscriber's set is designed to accommodate such a mode) in response to the handset being disconnected. Hence, a subscriber merely unplugs his or her handset in order to implement the night service or speakerphone special features.

In the past, a specially designed large modular plug was utilized for mechanically closing and opening a contact switch disposed within the receptor jack in response to the plug being connected to or disconnected therefrom, respectively. Two or more prongs typically extended from the plug for closing the contact switch which provided a signal to the PABX for indicating connection of the handset to the subscriber's set.

As a result of being mechanical in nature, the prongs were prone to breakage and fatique after a limited number of insertions and withdrawals into and out of the jack. In addition, dirt and dust particles carried by the prongs were frequently deposited on and resulted in a dirty contact, and hence a faulty connection.

According to the present invention, a microphone of the handset is connected in series with a source of direct current in response to being plugged into a jack. Circuitry is provided for detecting the passage of direct current through the jack (via the microphone) in order to provide an indication to an external controller such as a PABX, of the microphone being connected. Hence, according to the invention the microphone is being used primarily as a switch for passing D.C. current, in addition to its well known use as a signal translator.

By using the microphone as a switch for alternately passing or blocking the passage of D.C. current, the detection of connection of the handset to the subscriber's set is effected in a more efficient and reliable manner than the prior art mechanical handset detector.

Because of the electronic nature of the invention, disadvantages associated with the prior art mechanical detector, such as mechanical fatique, breakage, dirty contacts, etc., are overcome. The circuit is simple, and consequently inexpensive and easy to manufacture.

In general, the invention is an electronic telephone handset detector for connection to an external processor and a telephone handset, comprised of a source of direct current, a microphone of the telephone handset for connection to the source of direct current and conducting direct current in response thereto, and a circuit for detecting one of either the presence or absence of current being conducted through the microphone and generating an output signal for transmission to the external processor in response thereto. The output signal provides an indication to the external processor of the handset being connected to or disconnected from the subscriber's set.

More particularly, the invention is an electronic telephone handset detector of a subscriber's set, for connection to an external processor and a telephone handset, comprised of a microphone of the handset, a source of direct current, a switchable circuit path connected to the source of direct current, including a terminal for connection to the microphone and for passing direct current in the event the microphone is connected thereto and blocking the passage of direct current in the event the lead pair is disconnected therefrom, and a circuit connected to the switchable circuit path and the external processor for detecting the aforementioned passage of direct current through the circuit path and generating a first output signal to the external processor in response thereto, and generating a second output signal to the external processor in response to the absence of detection of passage of direct current through the circuit path. The first output signal provides an indication to the external processor of the handset being connected to the subscriber's set, and the second output signal provides an indication to the external processor of the handset being disconnected from the subscriber's set.

A better understanding of the invention will be obtained by reference to the detailed description below, in conjunction with the following drawing, in which:

FIG. 1 is a schematic diagram of a telephone handset detector according to a preferred embodiment of the invention.

With reference to FIG. 1, a microphone 1 of a telephone handset (or headset), is shown connected via leads 1A and 1B to input terminals 2A and 2B, respectively. A capacitor 3 is connected between terminals 2A and 2B in order to block D.C. current from passing therebetween in the event the microphone 1 is disconnected.

The microphone 1 is preferably an electret microphone comprised of a permanently polarized piece of dielectric material, such as barium titanate ceramic, which exhibits a permanent electric field. According to the preferred embodiment, a parallel plate capacitor C1 is formed of the dielectric material and connected across gate and source terminals of a MOS transistor T1. At least one plate of the capacitor C1 is movable and is set into vibration in response to sound waves impinging thereon. As the distance between the plates varies due to vibration, the electrostatic capacity, and hence the voltage across the capacitor C1 varies, thereby driving the gate terminal of transistor T1. Direct current flows between source and drain terminals of transistor T1 in response to the microphone 1 being connected to terminals 2A and 2B via leads 1A and 1B respectively, and is modulated in response to vibration of the capacitor plates.

Terminal 2A is connected to a source of voltage +V1 via series connected resistors 4 and 5. The node connecting resistors 4 and 5 is connected to an inverting input of comparator 6. A non-inverting input of comparator 6 is connected to the output of a voltage divider circuit comprised of series connected resistors 7 and 8. Resistor 7 is connected to the source of voltage +V1, and resistor 8 is connected to a further source of voltage −V2. Terminal 2B is connected to the further source of voltage −V2 via a resistor 9.

Operating power is applied to comparator 6 from the aforementioned sources of voltage +V2 and −V2, which in a successful prototype of the invention were +5 volts and −5 volts respectively.

Electret microphone 1 is a constant current device which, according to the successful prototype, draws approximately 200 μA of D.C. current from the first source of voltage (+V1) in response to being connected in a circuit thereto, via terminals 2A and 2B.

The voltage divider circuit comprised of resistors 7 and 8 results in a reference voltage, denoted as $V_{REF}$ being developed across resistor 8. In the successful prototype, $V_{REF}$ was approximately 1.47 volts, +V1 was approximately 1.8 volts, and resistors 7 and 8 had resistance values of approximately 1 k and 20 k ohms respectively.

In the event microphone 1 is disconnected from terminals 2A and 2B, no D.C. current flows through resistors 4 and 5, and hence the +V1 voltage (i.e., 1.8 volts in the successful prototype) is applied to the inverting input of comparator 6. Consequently, the output of comparator 6 goes to a negative voltage of approximately −V2 (i.e., −5 volts).

In the event microphone 1 is connected to terminals 2A and 2B via leads 1A and 1B, as a result of the handset (or headset) being plugged into the subscriber's set, current flows from the +V1 voltage source to the −V2 voltage source via resistors 4, 5 and 9, and through microphone 1. Hence, the voltage at the node connecting resistors 4 and 5 decreases from approximately +V1 (with microphone 1 disconnected) to a predetermined voltage established by the resistances of resistors 4 and 5 and the amount of current flowing therethrough.

As discussed above, in the successful prototype microphone 1 draws 200 μA of direct current. Also, resistors 4 and 5 were 510 and 5 k ohms respectively, resulting in a voltage at the node connecting resistors 4 and 5 of approximately 0.8 volts. The resistance values of resistors 4, 5, 7 and 8 are preferably chosen such that the aforementioned predetermined voltage at the node connecting resistors 4 and 5 is less than the reference voltage $V_{REF}$ in response to direct current flowing therethrough.

The output of comparator 6 goes to a high voltage of approximately +V2, in response to the voltage on the inverting input falling below the aforementioned reference voltage $V_{REF}$, applied to the non-inverting input.

The output of comparator 6 is connected to a base terminal of an NPN transistor 10 via input resistor 11. The base terminal of transistor 10 is connected to an emitter terminal thereof via a resistor 12. A collector terminal of transistor 10 is connected to the +V2 voltage source via a resistor 13 and to an output terminal 14 for connection to an external controller, such as a microprocessor μP, which typically forms a portion of the PABX in conjunction with which the present invention operates.

Transistor 10 in conjunction with resistors 11, 12 and 13 comprises a simple inverter circuit for level shifting the +V2 output voltage on the output of comparator circuit 6 to a logic low output signal, and level shifting the −V2 output voltage on the output of comparator 6 to a logic high output signal.

Transistor 10 is biased on in response to the aforementioned +V2 voltage appearing on the output of comparator 6 and applied to the base terminal. As a result, the voltage on output terminal 14 drops toward ground potential (approximately 0.2 volts, the saturated collector-emitter voltage of transistor 10).

Transistor 10 is biased off in response to the −V2 voltage appearing on the output of comparator 6 and being applied to the base terminal, such that the voltage on output terminal 14 rises toward +5 volts (the voltage generated by +V2).

Hence, it can be seen that in the event the microphone 1 is connected to terminals 2A and 2B, a logic low output signal is applied to terminal 14, and in the event the microphone 1 is disconnected from terminals 2A and 2B a logic high output signal is applied to terminal 14.

The external processor (microprocessor μP), receives the logic high and low output signals carried by terminal 14 and implements one or more of the aforementioned special features, such as night service or speakerphone modes, in response thereto.

As discussed above, the handset or headset is typically connected to a plug for connection to a jack disposed in the subscriber's set. The plug normally has four conductive contacts disposed thereon; one pair connected to the microphone and another pair connected to an earpiece of the handset. The four handset contacts engage four corresponding contacts of the jack in response to the handset being plugged in, thereby completing audio signal translation paths between the handset and subscriber's set. Hence, the terminals 2A and 2B, and leads 1A and 1B, discussed above with reference to FIG. 1, correspond to the aforementioned plug and jack microphone contact pairs.

The precise construction of the modular plug and jack is not essential to working or practicing of the present invention. Any suitable jack and plug pair can be used. However, an important aspect of the present invention is the use of the microphone of a telephone handset (or headset) for providing a direct current path for transmitting direct current, the transmission of which is detected such that output signals generated are indicative of the handset being alternatively plugged into or disconnected from the subscriber's set.

A person skilled in the art understanding this invention may now conceive of other embodiments or variations thereof, using the principles of the invention.

For instance, the output of comparator 6 can be connected directly to terminal 14 in the event the power supply inputs of comparator 6 are connected to +V2 and ground voltage sources (instead of the +V2 and −V2 sources as illustrated in FIG. 1), in which case the inverter circuit comprised of transistor 10 and resistors 11, 12 and 13 can be eliminated. Alternatively, the inverter circuit can be combined with comparator 6 in a single integrated circuit, in order to further reduce circuit complexity.

Also, microphone 1 can be a carbon or other dynamic type of microphone, suitable changes being made to the values of resistors 7 and 8 for establishing an appropriate reference voltage $V_{REF}$ in the event the microphone 1 draws more (or less) than 200 μA of direct current.

All these and other variations are considered to be within the sphere and scope of the invention, as defined in the claims appended hereto.

I claim:

1. In a subscriber's set, an electronic telephone headset detector for connection to an external processor for performing a predetermined special feature and a telephone handset, comprised of:
   (a) a microphone of said handset,
   (b) a source of direct current,
   (c) switchable circuit path means connected to said source of direct current, including terminal means for connection to said microphone, for passing direct current in the event said microphone is connected thereto and blocking the passage of direct current in the event said microphone is disconnected therefrom,
   (d) second means connected to said switchable circuit path means and said external processor for detecting said passage of direct current through said circuit path means and generating a first output signal to the external processor in response thereto, and generating a second output signal to the external processor in response to absence of detection of passage of direct current through said circuit path means, and
   (e) said external processor being adapted to receive said first and second output signals and in response perform said predetermined special features,
   whereby said first output signal provides an indication to the external processor of said handset being connected to the subscriber's set, and said second output signal provides an indication to the external processor of said handset being disconnected from said subscriber's set.

2. An electronic telephone handset detector as defined in claim 1, wherein said predetermined special feature is comprised of operation of said subscriber's set as a speakerphone.

3. An electronic telephone handset detector as defined in claim 1, wherein said predetermined special feature is comprised of automatic rerouting of incoming calls to a further predetermined subscriber's set.

4. An electronic telephone handset as defined in claim 1 wherein said second means is comprised of a comparator circuit having a first input connected to said circuit path means, a second input connected to a source of reference voltage, and an output connected in a circuit to said external processor.

5. An electronic telephone handset detector as defined in claim 1, wherein said circuit path means is comprised of a pair of series connected resistors connected between said source of direct current and said terminal means.

6. An electronic telephone handset detector as defined in claim 5, wherein said source of reference voltage is comprised of a further pair of series connected resistors connected to said source of direct current, having a node thereof connected to said input of the comparator circuit.

7. An electronic telephone handset detector as defined in claim 4, wherein said comparator circuit is comprised of an operational amplifier.

8. An electronic telephone handset as defined in claim 4, further including an inverter circuit connected to the output of said comparator circuit for inverting said output signals.

9. An electronic telephone handset detector as defined in claim 4, wherein said external processor is a microprocessor.

10. An electronic telephone handset detector as defined in claim 5, wherein said comparator circuit is comprised of an operational amplifier.

11. An electronic telephone handset detector as defined in claim 6, wherein said comparator circuit is comprised of an operational amplifier.

12. An electronic telephone handset as defined in claim 5, further including an inverter circuit connected to the output of said comparator circuit for inverting said output signals.

13. An electronic telephone handset as defined in claim 6, further including an inverter circuit connected to the output of said comparator circuit for inverting said output signals.

14. An electronic telephone handset detector as defined in claim 5, wherein said external processor is a microprocessor.

15. An electronic telephone handset detector as defined in claim 6, wherein said external processor is a microprocessor.